United States Patent
Kim

(10) Patent No.: US 10,061,452 B2
(45) Date of Patent: Aug. 28, 2018

(54) TOUCH DISPLAY DEVICE WITH CONSOLIDATED WIRES AND DRIVING METHOD THEREOF

(71) Applicant: Samsung Display Co., Ltd., Yongin-si (KR)

(72) Inventor: Chul Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 109 days.

(21) Appl. No.: 14/926,614

(22) Filed: Oct. 29, 2015

(65) Prior Publication Data

US 2016/0320877 A1 Nov. 3, 2016

(30) Foreign Application Priority Data

Apr. 30, 2015 (KR) .................. 10-2015-0062072

(51) Int. Cl.
- *G06F 3/044* (2006.01)
- *G06F 3/047* (2006.01)
- *G06F 3/041* (2006.01)

(52) U.S. Cl.
CPC .................................... *G06F 3/044* (2013.01)

(58) Field of Classification Search
CPC ........ G06F 3/044; G06F 3/0412; G06F 3/047; G06F 2203/04112
See application file for complete search history.

(56) References Cited

U.S. PATENT DOCUMENTS

| | | | | |
|---|---|---|---|---|
| 2011/0062971 A1* | 3/2011 | Badaye | ................... | G06F 3/044 324/686 |
| 2012/0235691 A1* | 9/2012 | Ho | ........................ | G06F 3/0418 324/658 |
| 2015/0170610 A1* | 6/2015 | Kurasawa | ................ | G09G 5/18 345/174 |
| 2016/0092019 A1* | 3/2016 | Huang | .................. | G06F 3/0416 345/174 |

FOREIGN PATENT DOCUMENTS

| KR | 10-2013-0031599 | 3/2013 |
|---|---|---|
| KR | 10-2013-0035243 | 4/2013 |
| KR | 10-2013-0044267 | 5/2013 |
| KR | 10-2014-0035788 | 3/2014 |
| KR | 10-2014-0100088 | 8/2014 |

* cited by examiner

*Primary Examiner* — Kwang-Su Yang
(74) *Attorney, Agent, or Firm* — H.C. Park & Associates, PLC

(57) ABSTRACT

A touch display device including sensing electrodes arranged on a single layer of a touch panel and a touch detection circuit configured to determine whether an object touched the touch panel by a voltage detected by the sensing electrodes. The sensing electrodes include a first group including two first sensing electrodes spaced apart by having a second sensing electrode interposed between the two first sensing electrodes. The first group is connected to the touch detection circuit through one wire. The sensing electrodes also include a second group including one second sensing electrode. The second group is connected to the touch detection circuit through one wire.

10 Claims, 6 Drawing Sheets

Prior Art

TOUCH DISPLAY DEVICE WITH CONSOLIDATED WIRES AND DRIVING METHOD THEREOF

CROSS-REFERENCE TO RELATED APPLICATION

This application claims priority from and the benefit of Korean Patent Application No. 10-2015-0062072, filed on Apr. 30, 2015, which is hereby incorporated by reference for all purposes as if fully set forth herein.

BACKGROUND

Field

Exemplary embodiments relate to a touch display device. More particularly, exemplary embodiments relate to a touch display device that has sensing electrodes disposed on a single layer.

Discussion of the Background

A touch display device includes a touch panel. The touch panel generally includes sensing electrodes disposed in a matrix. The touch display device is largely classified into a mutual-capacitance type and a self-capacitance type depending on the disposition of the sensing electrodes and a method of sensing a user touch the display panel.

FIG. 1 is a diagram illustrating a portion of the existing self-capacitance type touch display device. Referring to FIG. 1, in the existing touch display device, five sensing electrodes 101, 102, 103, 104, and 105 are disposed on a single layer and each sensing electrode is connected to pads through separate wires. Each wire is directly connected to touch detection circuits (not illustrated) or is connected to the touch detection circuits through a demultiplexer (not illustrated).

In order to increase the accuracy of detecting touch inputs (i.e., the touch resolution) of a touch display having the same screen size, a larger number of smaller sensing electrodes must be disposed in the same area. As a result, the number of wires connected to sensing electrodes from the touch detection circuits correspondingly increase. In other words, 10 sensing electrodes require 10 wires and 20 sensing electrodes require 20 wires.

Space is limited in a touch display, especially a touch display having a touch panel with a single layer structure. The limited space means that there is a limit to the number of wires that the touch display can house. Thus, only a limited number of sensing electrodes may be included in such a touch display, thereby limiting the touch resolution of the device. Parasitic capacitance also occurs between the wires or between the wires and the sensing electrodes further complicating matters and decreasing the reliability of such touch displays.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch display device and a driving method of the touch display device increasing the touch resolution while maintaining the number of wires of a touch panel.

Additional aspects will be set forth in the detailed description which follows, and, in part, will be apparent from the disclosure, or may be learned by practice of the inventive concept.

An exemplary embodiment discloses a touch display device including sensing electrodes arranged on a single layer of a touch panel and a touch detection circuit configured to determine whether an object touched the touch panel by a voltage detected by the sensing electrodes. The sensing electrodes include a first group including two first sensing electrodes spaced apart by having a second sensing electrode interposed between the two first sensing electrodes. The first group is connected to the touch detection circuit through a first wire. The sensing electrodes also include a second group including one second sensing electrode. The second group is connected to the touch detection circuit through a second wire.

An exemplary embodiment also discloses a driving method of a touch display device. The method includes applying a touch driving voltage to N second groups adjacent to a first group N times in a time division manner, detecting a touch detection voltage from the first group N times in the time division manner, and determining which first sensing electrode of two first sensing electrodes of the first group is touched by an object.

An exemplary embodiment further discloses a driving method of a touch display device. The method includes applying a touch driving voltage to a first group, detecting a touch detection voltage from the first group, and determining which first sensing electrode of two first sensing electrodes of the first group was touched by an object based on a magnitude of the touch detection voltage. The two sensing electrodes are connected to a touch detection circuit through one wire.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
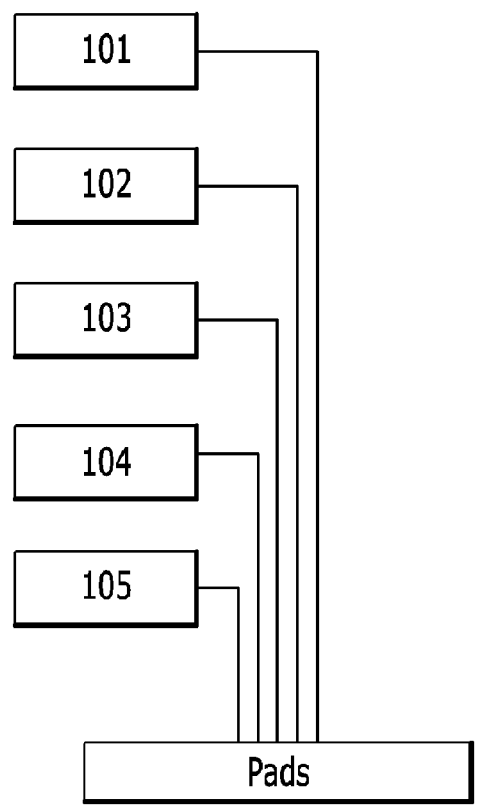
FIG. 1 is a diagram illustrating a portion of an existing self-capacitance type touch display device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
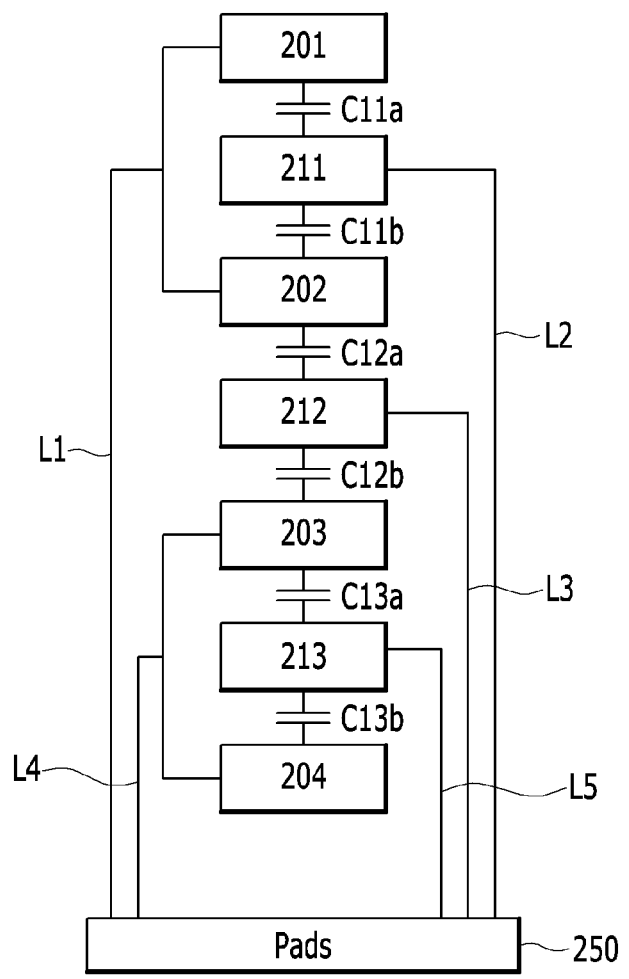
FIG. 2 is a diagram illustrating a portion of a touch display device according to an exemplary embodiment.

FIG. 2 is a diagram illustrating a portion of a touch display device according to an exemplary embodiment.

Referring to FIG. 2, a touch display device according to an exemplary embodiment includes first sensing electrodes 201, 202, 203, and 204, second sensing electrodes 211, 212, and 213, and pads 250.

The first sensing electrodes 201, 202, 203, and 204 and the second sensing electrodes 211, 212, and 213 are arranged on a single layer. All the wires L1, L2, L3, L4, and L5 extend in the same direction (substantially vertical direction). Therefore, a separate bridge electrode or a bridge electrode layer is not required.

The exemplary embodiment illustrated in FIG. 2 shows seven sensing electrodes 201, 202, 203, 204, 211, 212, and 213. However, it is apparent to those skilled in the art that the touch display device may be configured by increasing the number of sensing electrodes in the same pattern according to structural features of the sensing electrode to be described below.

The sensing electrodes 201, 202, 203, 204, 211, 212, and 213 may include at least one first group (i.e., a first sensing electrode group) and one second group (i.e., a second sensing electrode group).

According to an exemplary embodiment of FIG. 2, the touch display device includes two first groups (i.e., first sensing electrodes 201 and 202 as well as first sensing electrodes 203 and 204) and three second sensing electrodes (i.e., second sensing electrodes 211, 212, and 213).

The first first group may include at least two first sensing electrodes spaced by having at least one second sensing electrode interposed between the first two sensing electrodes. For example, the first group may include the two first sensing electrodes 201 and 202 spaced by having the second sensing electrode 211 interposed between first sensing electrodes 201 and 202.

A second first group may include the two first sensing electrodes 203 and 204 spaced by having a second second sensing electrode 213 interposed between the second first group of first sensing electrodes 201 and 202.

A second group may include one second sensing electrode 211 interposed between the two first sensing electrodes 201 and 202.

A second second group may include one second sensing electrode 212 interposed between the two first sensing electrodes 202 and 203.

A third second group may include the second sensing electrode 213 interposed between the two first sensing electrodes 203 and 204.

One first group of first sensing electrodes 201 and 202 are connected to wire L1. The second first group of first sensing electrodes 203 and 204 are connected to wire L4. Each of second sensing electrodes 211, 212, and 213 are connected to the wires L2, L3, and L5, respsectively. Each of the wires L1, L2, L3, L4, and L5 is connected to a touch detection circuit 10 (see FIG. 3) through the pads 250. The touch detection circuit 10 may be directly connected to each of the wires L1, L2, L3, L4, and L4 or may be connected thereto through a demultiplexer.

Thus, the exemplary embodiment shown in FIG. 2 illustrates five wires L1, L2, L3, L4, and L5 that connect to the pads 250 for seven sensing electrodes 201, 202, 203, 204, 211, 212, and 213. In comparison, the related art of FIG. 1 has five sensing electrodes 101, 102, 103, 104, and 105 that also require five wires. Thus, a touch display device of the exemplary embodiment in FIG. 2 may include more sensing electrodes than a touch display devices of related art FIG. 1 in the same dimensions because the touch display device of FIG. 2 has less wires connected to the pads 250. Thus, touch display device of FIG. 2 can have a higher touch resolution (i.e., more sensing electrodes) than the touch display device of the related art. For the exemplary embodiment of FIG. 2, a particular driving method is needed to determine whether a user touched the display panel near one of the two first sensing electrodes 201 and 202 sharing the wire L1. This will be described in detail with reference to FIG. 4.

The two first groups of first sensing electrodes 201, 202, 203, and 204 and the three second sensing electrodes 211, 212, and 213 may be alternately disposed to each other in a wire forming direction. Therefore, the first sensing electrodes 201, 202, 203, and 204 and the second sensing electrodes 211, 212, and 213 may each form mutual capacitance with adjacent sensing electrodes.

The first sensing electrode 201 and the second sensing electrode 211 may form mutual capacitance C11a. The second sensing electrode 211 and the first sensing electrode 202 may form mutual capacitance C11b. The first sensing electrode 202 and the second sensing electrode 212 may form mutual capacitance C12a. The second sensing electrode 212 and the first sensing electrode 203 may form mutual capacitance C12b. The first sensing electrode 203 and the second sensing electrode 213 may form mutual capacitance C13a. The second sensing electrode 213 and the first sensing electrode 204 may form mutual capacitance C13b.

Figure 3:
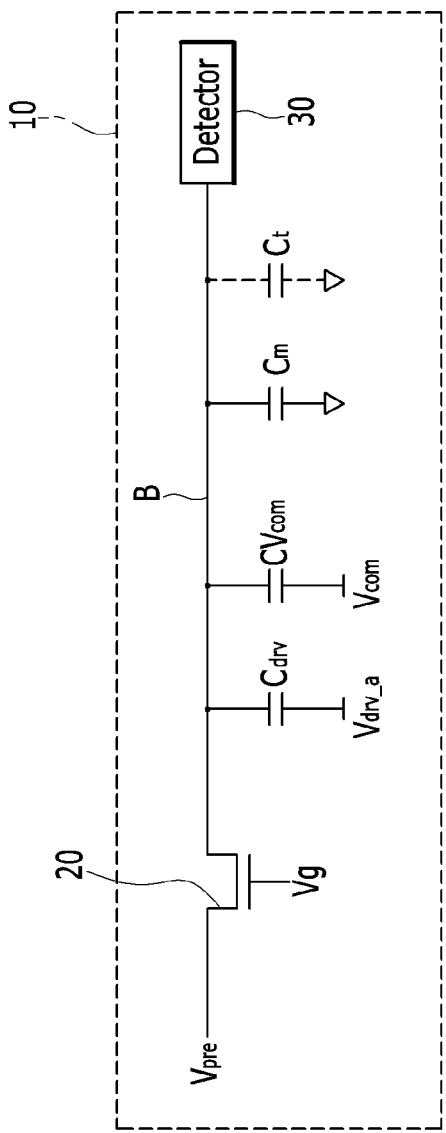
FIG. 3 is a diagram illustrating a touch detection circuit according to an exemplary embodiment.

FIG. 3 is a diagram illustrating a touch detection circuit according to an exemplary embodiment.

Referring to FIG. 3, the touch detection circuit 10 may include a reserved voltage charger 20, a driving capacitor $C_{drv}$, and a detector 30. Capacitances $C_{Vcom}$, $C_m$, and $C_t$ may not be a configuration which is physically manufactured, but capacitance may be generated based on a relationship with other components.

The touch detection circuit 10 may be connected to the sensing electrodes 201, 202, 203, 204, 211, 212, and 213 through a node B. A sensing electrode of the sensing electrodes 201, 202, 203, 204, 211, 212, and 213 may form the touch capacitance $C_t$ with an object (i.e., a user's finger or a stylus pen) when the object contacts the touch panel near the sensing electrode. When the object does not contact the touch panel near the sensing electrode, the touch capacitance $C_t$ may not be present. This application refers to an object touching the touch panel near a particular sensing electrode. Touching the touch panel near a particular sensing electrode may include touching a particular sensing electrode. Touching the touch panel may also include touching a particular sensing electrode or more than one sensing electrode.

The reserved voltage charger 20 may apply a reserved voltage $V_{pre}$ to the node B depending on a control signal $V_g$. The reserved voltage charger 20 may be configured as a transistor. In FIG. 3, the reserved voltage charger 20 may be configured as an N-type transistor. The reserved voltage charger 20 may apply the reserved voltage $V_{pre}$ to the node B when the control signal $V_g$ is in a high level. The reserved voltage $V_{pre}$ may be sufficiently applied until the capacitances $C_{drv}$, $C_{Vcom}$, $C_m$, and $C_t$ connected to the node B are charged.

When the node B is charged with the reserved voltage $V_{pre}$, the control signal $V_g$ may be in a low level and thus becomes a Hi-z state. The detector 30 may be in a state in which it is not applied with the touch detection voltage and therefore is in the Hi-z state. Therefore, the charge of the charged node B may be in an isolated state.

One terminal of the driving capacitor $C_{drv}$ may be connected to the node B and the other terminal of driving capacitor $C_{drv}$ may be connected to a driving voltage supplying line. The driving capacitor $C_{drv}$ may be applied with a touch driving voltage $V_{drv\_a}$ through the driving voltage supplying line according to a control of the touch detection circuit 10. Therefore, the voltage of the node B is changed. In this case, the voltage of the node B is called a touch detection voltage $V_B$ (not shown). The touch detection voltage $V_B$ may be changed based on the previously charged reserved voltage $V_{pre}$. The detector 30 may receive the touch detection voltage $V_B$ and compares a magnitude of the touch detection voltage $V_B$ with a first voltage $V_{B\_ref}$ (not shown) which is a predetermined reference voltage to discriminate the user touch. The first voltage $V_{B\_ref}$ is the touch detection voltage when the user touch is not generated.

However, one touch detection circuit 10 may supply the touch driving voltage $V_{drv\_a}$. When the touch detection circuit 10 senses the touch detection voltage $V_B$, the touch detection circuit 10 may detect the touch of an object (i.e., a user's finger or a stylus pen) by a self-capacitance type. A method for driving the self-capacitance type touch display device will be described in detail with reference to FIG. 6.

The case in which at least two touch detection circuits 10 interact to detect the touch from an object may be called a mutual-capacitance type. Specifically, the mutual-capacitance type is a type of supplying the touch driving voltage $V_{drv\_a}$ by one touch detection circuit 10 and detecting the touch detection voltage $V_B$ using the mutual capacitance between the sensing electrodes by other touch driving circuit or circuits. An exemplary embodiment of driving a touch display device by mutual-capacitance type will be described in detail with reference to FIG. 4. While the driving type is exemplified in FIG. 4 as a mutual capacitance type, the arrangement of sensing electrodes 201, 202, 203, 204, 211, 212, and 213 of FIG. 2 may be applied using the self-capacitance type driving of FIG. 6.

The common electrode capacitance $C_{Vcom}$ means parasitic capacitance between a common electrode included in the touch display device and the sensing electrodes 201, 202, 203, 204, 211, 212, and 213 connected to the node B. When the touch display device is a liquid crystal display, the common electrode may be a plate-like electrode facing a pixel electrode and having a liquid crystal layer interposed between the common electrode and the pixel electrode. When the touch display device is an organic light emitting display, the common electrode may be a plate-like cathode in which organic light emitting diodes of each pixel are commonly used.

The touch detection circuit 10 may be configured to be driven through the common electrode, thereby avoiding the change in the voltage applied to the common electrode capacitance $C_{Vcom}$. The change in the voltage acts as noise in touch detection by the touch detection circuit 10.

The mutual capacitance $C_m$ is capacitance formed between the sensing electrode connected to the node B and the adjacent sensing electrodes. The mutual capacitance $C_m$ may be determined for each sensing electrode depending on the number of adjacent sensing electrodes and the distance between the adjacent sensing electrodes. Thus, the $C_m$ for each sensing electrode may be different.

Figure 4:
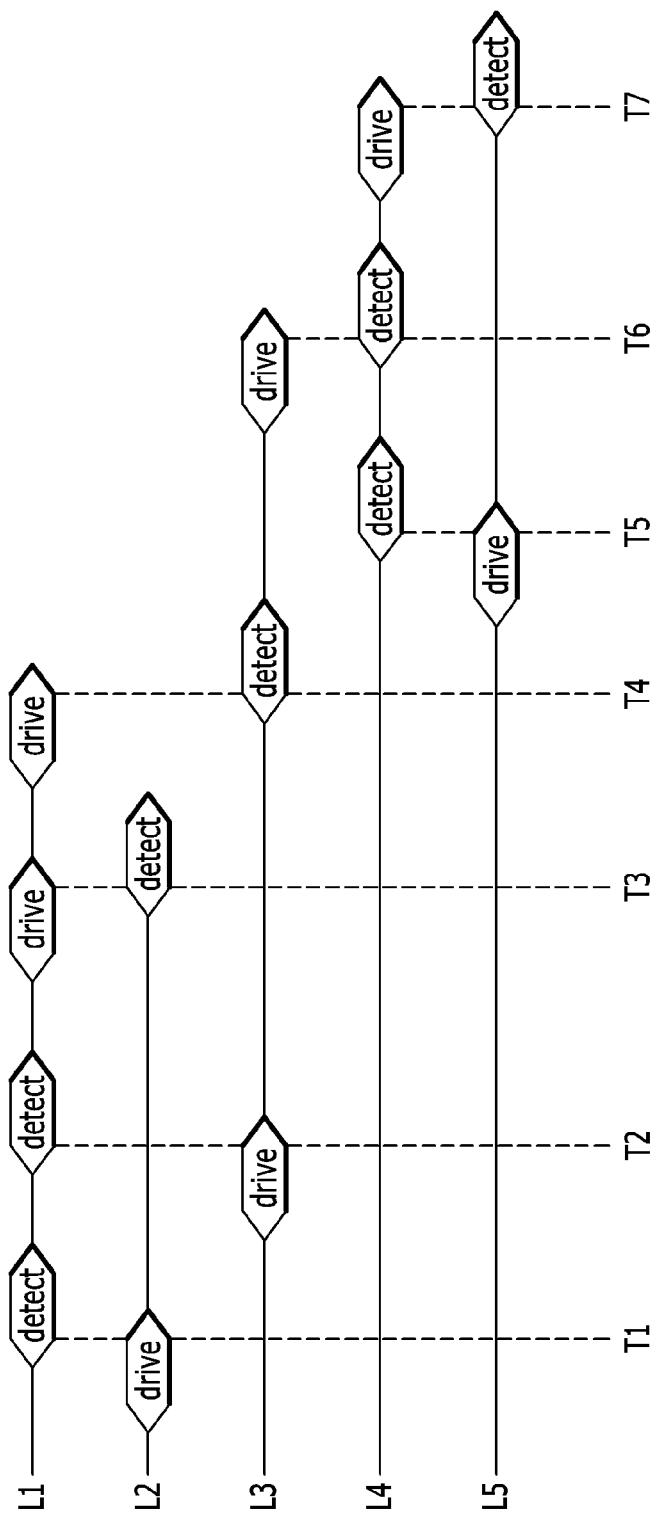
FIG. 4 is a diagram illustrating a driving method of a touch display device according to an exemplary embodiment.

FIG. 4 is a diagram illustrating a driving method of a touch display device according to an exemplary embodiment. For clarity, the driving method of FIG. 4 refers to the display device illustrated in FIG. 2. However, the driving method of FIG. 4 is not limited to the single configuration illustrated in FIG. 2.

Referring to FIG. 4, a drive and a detect are disposed in a time order based on each of the wires L1, L2, L3, L4, and L5. However, for FIG. 4 the touch display device may include the two touch detection circuits 10 that may include a transmitting touch detection circuit applying two touch driving voltage $V_{drv\_a}$ and a receiving touch detection circuit detecting the touch detection voltage $V_B$. The configuration of the transmitting touch detection circuit and the receiving touch detection circuit may be the same as the touch detection circuit 10 described with reference to FIG. 3. Thus, the description of the transmitting touch detection circuit and the receiving touch detection circuit is omitted for brevity. However, the reserved voltage $V_{pre}$ of the transmitting touch detection circuit and the receiving touch detection circuit may be set differently. The transmitting touch detection circuit and the receiving touch detection circuit each may be selectively connected to one wire through the demultiplexer.

The touch detection may distinguish whether a user touches the touch panel near the first sensing electrode 201 or the first sensing electrode 202 in the first group.

First, the transmitting touch detection circuit may be connected to the wire L2 and the node B may be charged with the reserved voltage $V_{pre}$. Further, the touch driving voltage $V_{drv\_a}$ may be applied to the driving capacitor $C_{drv}$ of the transmitting touch detection circuit. Therefore, the drive of the wire L2 starts. The second touch driving voltage $V_{drv\_b}$ generated at the node B of the transmitting touch detection circuit may be approximately calculated as follows in proportion to the capacitance.

$$V_{drv\_b} V_{pre} + V_{drv\_a\_delta}*(C_{drv}(C_{drv}+C_{Vcom}+C_m)) \quad \text{(Equation 1)}$$

The voltage $V_{drv\_a\_delta}$ of Equation 1 means a variation of the touch driving voltage $V_{drv\_a}$ and is positive value at a rising edge of the touch driving voltage $V_{drv\_a}$ and is a negative value at a falling edge of the touch driving voltage $V_{drv\_a}$.

The second sensing electrode 211 may be connected to the wire L2 and thus the mutual capacitance $C_m$ is defined based on the second sensing electrode 211. More specifically, a sum of the mutual capacitance $C11a$ generated with the first sensing electrode 201 adjacent to the second sensing electrode 211 and the mutual capacitance $C11b$ generated with the first sensing electrode 202 becomes the mutual capacitance $C_m$.

The mathematical relation described above and a mathematical relation to be described below are approximate. Therefore, detailed factors may be added or deleted according to an actual design of a product.

The receiving touch detection circuit may be connected to the wire L1 and the node B of the receiving detection circuit is charged with the reserved voltage $V_{pre}$. The exemplary embodiment illustrates that the touch detection signal $V_B$ is detected corresponding to a succeeding second edge of the touch driving voltage $V_{drv\_a}$.

Timing T1 is a latter half of the drive and is a timing corresponding to the second edge (falling or rising edge) of the touch driving voltage $V_{drv\_a}$. This is an exemplified timing and according to an exemplary embodiment, the timing T1 is a front half of the drive and may be timing corresponding to a first edge (rising or falling edge) of the touch driving voltage $V_{drv\_a}$. Further, according to an exemplary embodiment, the drive and the detect overlap more and thus the touch detection voltage $V_B$ may also be detected twice, corresponding to the first edge and the second edge of the touch driving voltage $V_{drv\_a}$.

The receiving detection circuit detects the touch detection voltage $V_B$ depending on the following Equation 2 at the timing T1.

$$V_B = V_{pre} + V_{drv\_b\_delta}*((C11a+C11b)/(C_{drv}+C_{Vcom}+C11a+C11b+C12a+C_t)) \quad \text{(Equation 2)}$$

The voltage $V_{drv\_b\_delta}$ means a variation of the second touch driving voltage $V_{drv\_b}$ and is positive value at a rising edge of the second touch driving voltage $V_{drv\_b}$ and is a negative value at a falling edge of the second touch driving voltage $V_{drv\_b}$.

The node B of the receiving detection circuit may be connected to the first sensing electrode 201 and the first sensing electrode 202 through the wire L1. Therefore, the second touch driving voltage $V_{drv\_b}$ is applied to the node B of the receiving detection circuit through the mutual capacitance $C11a$ and the mutual capacitance $C11b$. In this case, the mutual capacitance $C_m$ of FIG. 3 may be a sum of the mutual capacitances $C11a$, $C11b$, and $C12a$.

In Equation 2, the touch capacitance $C_t$ is further included in the denominator. The first sensing electrodes 201 and 202 may be connected to the same node B and also may have the same physical distance. Therefore, it may not be appreciated at the current timing T1 whether the an object touches the touch panel near the first sensing electrode 201 or the first sensing electrode 202. In an exemplary embodiment, all the sensing electrodes 201, 202, 203, 204, 211, 212, and 213 have the same size and shape and are disposed at equal intervals. The resistance values of the wires L1, L2, L3, L4, and L5 are equal to each other and the parasitic capacitance value may be disregarded.

The detector 30 of the receiving detection circuit may compare the touch detection voltage $V_B$ with the first voltage $V_{B\_ref}$ to count a frequency of the case in which the difference exceeds a specific threshold range. As described above, the first voltage $V_{B\_ref}$ is the touch detection voltage when the an object has not touched the touch panel. The foregoing specific threshold range may be differently defined depending on specifications (e.g., capacitance value, resistance value, predetermined touch sensitivity) of the product.

In an exemplary embodiment, an object touches the touch panel near either the first sensing electrode 201 or the second sensing electrode 202 included in the first group. Thus, the counting frequency is 1. As described above, it may not be appreciated at the current timing T1 whether the object touched the touch panel near the first sensing electrode 201 and the first sensing electrode 202.

Next, by the same process as described above, the touch driving voltage $V_{drv\_a}$ may be applied to the wire L3 and the touch detection voltage $V_B$ may be detected through the wire L1, based on timing T2. In this case, the mutual capacitance $C_m$ of Equation 1 is equal to the mutual capacitance $C12a$ and Equation 2 may be substituted with the following Equation 3.

$$V_B = V_{pre} + V_{drv\_b\_delta}*(C12a/(C_{drv}+C_{Vcom}+C11a+C11b+C12a+C_t)) \quad \text{(Equation 3)}$$

Compared with the above Equation 2, the capacitance $C11a+C11b$ of numerator of the above Equation 2 is substituted into the capacitance $C12a$ of the above Equation 3. This results from the application of the second touch driving voltage $V_{drv\_b}$ from the second sensing electrode 212.

In this case, the touch capacitance $C_t$ is changed depending on whether an object touches the touch panel near the first sensing electrode 201 or the first sensing electrode 202.

More specifically, when an object touches the touch panel near the first sensing electrode 201, the touch capacitance $C_t$ is sensed to be relatively smaller than the touch capacitance $C_t$ sensed when the same object touches the touch pane near the first sensing electrode 202. The reason is that the second touch driving voltage $V_{drv\_b}$ is applied through the first sensing electrode 202 and therefore when the first sensing electrode 202 and the object (i.e., a user's finger or a stylus pen) configures the touch capacitance $C_t$, the change in the charge quantity charged in the first sensing electrode 202 due to the second touch driving voltage $V_{drv\_b}$ stops.

Therefore, comparing with the first voltage $V_{B\_ref}$ on whether the an object touched the touch panel near the first sensing electrode 202 in which the touch capacitance $C_t$ is sensed to be relatively larger than the first sensing electrode 201 easily sets the foregoing specific threshold range. More specifically, in an exemplary embodiment, the touch detection voltage $V_B$ when the first sensing electrode 201 is touched is of no significant difference from the first voltage $V_{B\_ref}$. The higher the touch resolution, the smaller the size of each of the sensing electrodes 201, 202, 203, 204, 211, 212, and 213, and therefore the touch detection voltage $V_B$ when the first sensing electrode 201 is touched is of no significant difference from the first voltage $V_{B\_ref}$.

According to an exemplary embodiment, the touch detection voltage $V_B$ when the first sensing electrode 201 is touched has a predetermined difference from the first voltage $V_{B\_ref}$. When the detector 30 determines the predetermined difference, the drive and the detect at the timing T1 may be omitted. In other words, it may be determined whether an object touches the touch panel near the first sensing electrode 201 and the first sensing electrode 202 only by the drive and the detect at the timing T2.

The receiving touch detection circuit may compare the touch detection voltage $V_B$ with the first voltage $V_{B\_ref}$ to count the frequency of the case in which the difference exceeds a specific threshold range.

According to an exemplary embodiment, when an object touches the touch panel near the first sensing electrode 201 (i.e., including touching the first sensing electrode 201), the difference between the touch detection voltage $V_B$ and the first voltage $V_{B\_ref}$ does not exceed the specific threshold range, and therefore the frequency is not counted. Thus, a total of counting frequency is 1. Accordingly, the touch detection circuit 10 determines that the object touches the touch panel near the first sensing electrode 201 (i.e., touches the first sensing electrode 201).

According to an exemplary embodiment, when an object touches the touch panel near the first sensing electrode 202, the difference between the touch detection voltage $V_B$ and the first voltage $V_{B\_ref}$ exceeds the specific threshold range, and therefore the frequency is counted. Thus, a total of counting frequency is 2. Accordingly, the touch detection circuit 10 determines that the object touched the first sensing electrode 202 or near the first sensing electrode 202.

Therefore, it may be determined at the timing T2 whether the object touched the first sensing electrode 201 and the first sensing electrode 202.

At the timing T3, the transmitting touch detection circuit may be connected to the wire L1 and the receiving touch detection circuit may be connected to the wire L2. The second group may include only one second sensing electrode 211 and therefore there is no need to determine whether an object touched one of two sensing electrodes because the second sensing electrode 211 may have its own wire L2, not shared by another sensing electrode. Therefore, it may be immediately appreciated at timing T3 whether an object touched the second sensing electrode 211 (or near the second sensing electrode 211) by comparing the touch detection voltage $V_B$ of the receiving touch detection circuit with the first voltage $V_{B\_ref}$. This driving method is similar to the driving method at the timing T1 and thus additional details and the associated Equation are omitted for brevity.

At the timing T4, the transmitting touch detection circuit may be connected to the wire L1 and the receiving touch detection circuit may be connected to the wire L3. The second group may include only one second sensing electrode 212. Thus, there is no need to determine whether an object has touched one sensing electrode over another sensing electrode because the second sensing electrode 212 may have its own wire L3, not shared by another sensing electrode. Thus, it may be immediately appreciated at timing T4 whether the an object touched the second sensing electrode 212 by comparing the touch detection voltage $V_B$ of the receiving touch detection circuit with the first voltage $V_{B\_ref}$. This driving method is similar to the driving method at the timing T1 and thus the additional details and the associated Equation are omitted for brevity.

At the timing T5, the transmitting touch detection circuit may be connected to the wire L5 and the receiving touch detection circuit may be connected to the wire L4. Based on timing T5, the second touch driving signal $V_{drv\_b}$ generated from the second sensing electrode 213 may be applied to the first sensing electrode 203 and the first sensing electrode 204 of the first groups through the mutual capacitances C13a and C13b. The receiving touch detection circuit may compare the touch detection voltage $V_B$ sensed through the wire L4 with the first voltage $V_{B\_ref}$ to count the frequency of the case in which the difference exceeds the specific threshold range. Even though an object has touched the touch panel, it may not be appreciated at the current timing T5 whether the object touched the touch panel near the first sensing electrode 203 or the first sensing electrode 204.

At the timing T6, the transmitting touch detection circuit may be connected to the wire L3 and the receiving touch detection circuit may be connected to the wire L4. Based on timing T6, the second touch driving signal $V_{drv\_b}$ generated from the second sensing electrode 212 may be applied to the first sensing electrode 203 through the mutual capacitance C12b. The receiving touch detection circuit may compare the touch detection voltage $V_B$ detected based on the first sensing electrode 203 with the first voltage $V_{B\_ref}$ to count the frequency when the difference exceeds the specific threshold range. The touch detection circuit 10 may determine that an object did not touch the touch panel from the first groups of the first sensing electrode 203 and the first sensing electrode 204 when a total of counting frequency is 0. Further, the touch detection circuit 10 may determine that an object touched the touch panel near the first sensing electrode 204 when the total of counting frequency is 1. Further, the touch detection circuit 10 may determine that an object touched the touch panel near the first sensing electrode 203 when the total of counting frequency is 2. The driving methods at the timings T5 and T6 are each similar to the driving methods at the timings T1 and T2. Thus, additional details and the associated Equations are omitted for brevity.

At the timing T7, the transmitting touch detection circuit may be connected to the wire L4 and the receiving touch detection circuit may be connected to the wire L5. The second group may include only one second sensing electrode 213. Thus, there is no need to determine whether the an object has touched one of two electrodes sharing the same wire. It may be immediately appreciated at timing T7 whether an object user touched the second sensing electrode 213 by comparing the touch detection voltage $V_B$ of the receiving touch detection circuit with the first voltage $V_{B\_ref}$. The driving method is similar to the driving method at the timing T1. Thus, additional details and the associated Equation will be omitted for brevity.

In summary, referring to FIGS. 2 and 4, even though the pads 250 (i.e., five pads) may be connected to the wires L1, L2, L3, L4, and L5, the pads 250 may receive touch information from the touching object (i.e., a user's finger or a stylus pen) from seven sensing electrodes 201, 202, 203, 204, 211, 212, and 213. Further, the touch detection circuit 10 may apply the touch driving voltage $V_{drv\_a}$ in a time division manner and may detect the touch detection voltage $V_B$ to determine whether an object touched the touch panel near any sensing electrode (i.e., including contacting a sensing electrode). Therefore, according to an exemplary embodiment, for a particular size touch display panel, it is possible to increase the touch resolution while maintaining the number of wires and pads of the touch panel.

The exemplary embodiment described with reference to FIG. 4 requires seven timings T1, T2, T3, T4, T5, T6, and T7 at which it is determined whether the an object touches any of the seven sensing electrodes 201, 202, 203, 204, 211, 212, and 213. The exemplary embodiment described with reference to FIG. 4 includes the touch detection circuit 10 is configured to receive touch detection circuit and the transmitting touch detection circuit. However, the touch detection circuit 10 may be configured to receive three detection circuits or more, the driving method may be derived at 7 timings or less. In connection with this, there may be various methods of using the wires that are not currently occupied or methods of using both of the first edge and the second edge of the touch driving voltage $V_{drv\_a}$ for the touch determination.

FIG. 2 illustrates an exemplary embodiment where each second group includes only one second sensing electrode, but exemplary embodiments are configured to include multiple second sensing electrodes as second groups. In this case, the touch driving voltage needs to be applied multiple times in the time division manner, meeting the number of the second sensing electrodes, and detecting the touch detection voltage multiple times in the time division manner. For example, the disposition of the sensing electrodes illustrated in FIG. 5 may be adopted. Thus, the driving method according to the first exemplary embodiment may be driven. The principle at the timings T1 and T2 are similar to what was discussed above. Thus, the description of timings T1 and T2 with respect to FIG. 5 will be omitted for brevity.

Figure 5:
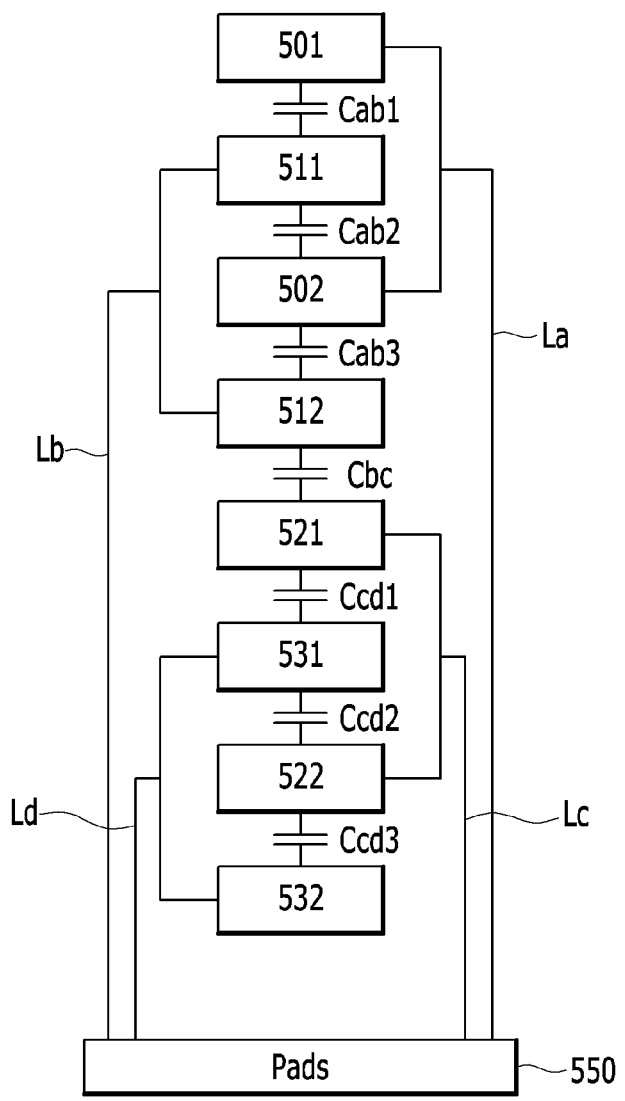
FIG. 5 is a diagram illustrating a portion of a touch display device according to an exemplary embodiment.

FIG. 5 is a diagram illustrating a portion of a touch display device according to an exemplary embodiment.

Referring to FIG. 5, the touch display device according to an exemplary embodiment includes first sensing electrodes 511, 512, 531, and 532, second sensing electrodes 501, 502, 521 and 522, and a pads 550.

The first sensing electrodes 511, 512, 531, and 532 and the second sensing electrodes 501, 502, 521, and 522 may be arranged on a single layer. All the wires La, Lb, Lc, and Ld may extend in the same direction (substantially vertical direction) and therefore a separate bridge electrode or a bridge electrode layer is not required.

The sensing electrodes 501, 502, 511, 512, 521, 522, 531, and 532 may include at least one first group and second group.

The touch display device according to an exemplary embodiment includes two first groups (i.e., first sensing electrodes 511 and 512 forming a first group and first sensing electrodes 531 and 532 forming another first group) and two second groups (i.e., second sensing electrodes 501 and 502 forming one second group and second sensing electrodes 521 and 522 forming another second group).

The first groups may include at least two first sensing electrodes spaced by having at least one second sensing electrode interposed between the at least two first sensing electrodes. According to an exemplary embodiment, the first group including first sensing electrodes 511 and 512 include the second sensing electrode 502 interposed between the first sensing electrodes 511 and 512. Similarly, the first group including first sensing electrodes 531 and 532 may include the second sensing electrode 522 interposed between first sensing electrode 511 and 512.

The second groups may include at least two second sensing electrodes spaced apart by having at least one first sensing electrode interposed between the at least two second sensing electrodes. According to an exemplary embodiment, the second group including second sensing electrodes 501 and 502 include the first sensing electrode 511 interposed between the second sensing electrodes 501 and 502. The second group including second sensing electrodes 521 and 522 may include the first sensing electrode 531 interposed between the second sensing electrodes 521 and 522.

The first group including the first sensing electrodes 511 and 512 may be connected to wire Lb. The first group including the first sensing electrodes 531 and 532 may be connected to wire Ld. The second group including second sensing electrodes 501 and 502 may be connected to wire La. The second group including second sensing electrodes 521 and 522 may be connected to wire Lc. Each of the wires La, Lb, Lc, and Ld may be connected to the touch detection circuit 10 (see FIG. 3) through the pads 550. The touch detection circuit 10 may be directly connected to each of the wires La, Lb, Lc, and Ld or may be connected to the wires La, Lb, Lc, and Ld through the demultiplexer.

Therefore, compared with the related art of FIG. 1 in which five sensing electrodes 101, 102, 103, 104, and 105 require five wires, the exemplary embodiment illustrates eight sensing electrodes (i.e., sensing electrodes 501, 502, 511, 512, 521, 522, 531, and 532) with four wires (i.e., wires La, Lb, Lc, and Ld) for a device having the same size constraints. Thus, the number of sensing electrodes is doubled in the exemplary embodiment illustrated in FIG. 5 while having a smaller number of wires. With the increased number of sensing electrodes, the touch resolution increases (i.e., the accuracy of detecting touch inputs). In this case, the driving method for determining whether an object touched any one of the two second sensing electrodes 501 and 502 sharing the wire La is required. This will be described in detail with reference to FIG. 6.

First sensing electrodes 511, 512, 531, and 532 may be alternately disposed with the second sensing electrodes 501, 502, 521, and 522 in a wire forming direction. In other words, the first groups and the second groups may be alternately disposed in a wire forming direction. Therefore, the first sensing electrodes 511, 512, 531, and 532 and the second sensing electrodes 501, 502, 521, and 522 may each form mutual capacitance with adjacent sensing electrodes.

The first sensing electrode 511 and the second sensing electrode 501 may form mutual capacitance Cab1. The first sensing electrode 511 and the second sensing electrode 502 may form mutual capacitance Cab2. The first sensing electrode 512 and the second sensing electrode 502 may form mutual capacitance Cab3. The first sensing electrode 512 and the second sensing electrode 521 may form mutual capacitance Cbc. The first sensing electrode 531 and the second sensing electrode 521 may form mutual capacitance Ccd1. The first sensing electrode 531 and the second sensing electrode 522 may form mutual capacitance Ccd2. The first sensing electrode 532 and the second sensing electrode 522 may form mutual capacitance Ccd3.

Figure 6:
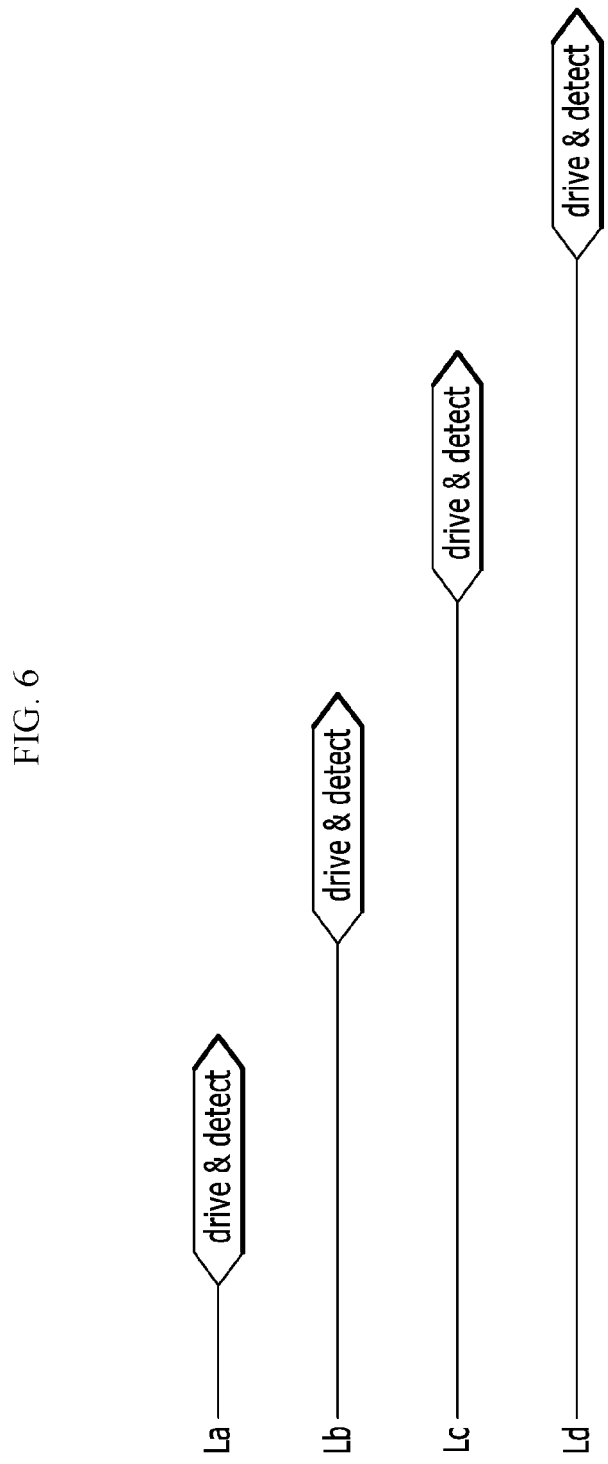
FIG. 6 is a diagram illustrating a driving method of a touch display device according to an exemplary embodiment.

FIG. 6 is a diagram illustrating a driving method of a touch display device according to an exemplary embodiment. The exemplary embodiment of FIG. 6 includes using the touch detection circuit 10 of FIG. 3. The exemplary embodiment illustrated in FIG. 6 adopts another kind of self-capacitance type touch detection circuit.

The driving method of FIG. 6 may include multiple sensing electrodes in each group and that a sensing electrode of the group has at least one of a resistance value and a capacitance value that is different within from another sensing electrode of the same the group. The case in which the resistance values are different between sensing electrodes of the same group may comprise a case in which the resistance of the wires connected to each sensing electrode are designed to be different. As described above, to make the resistance value or the capacitance value different, at least one of the shapes and structure materials of each sensing electrode included in the group may be different.

First, a method of determining whether an object touched the second sensing electrodes 501 and 502 of the same grouping connected via wire La to the touch detection circuit 10 will be described.

As described above, the touch detection circuit 10 may be operated by the self-capacitance type in the driving method of FIG. 6. More specifically, the touch detection circuit 10 may charge the node B with the reserved voltage $V_{pre}$, may apply the touch driving voltage $V_{drv\_a}$ to the driving capacitor $C_{drv}$, and may detect the touch detection voltage $V_B$ of the node B to determine whether an object touched the touch panel.

$$V_B = V_{pre} + V_{drv\_a\_delta} * (C_{drv}/(C_{drv} + C_{Vcom} + C_m + C_t)) \quad \text{(Equation 4)}$$

The mutual capacitance $C_m$ of the above Equation 4 corresponds to mutual capacitance Cab1+Cab2+Ccb3 connected to the node B. If the an object does not touch the touch panel, the touch capacitance $C_t$ is 0. In this case, the touch detection voltage $V_B$ corresponds to the first voltage $V_{B\_ref}$. If an object touches the touch panel, the touch capacitance $C_t$ is a value exceeding 0. Therefore, the detector 30 may compare the touch detection voltage $V_B$ with the first voltage $V_{B\_ref}$ to determine whether an object touched the touch panel near the second sensing electrodes 501 and 502.

In this case, for example, the touch capacitance $C_t$ formed by the second sensing electrode 501 and the touching object may be larger than the touch capacitance $C_t$ formed by the second sensing electrode 502 and the touching object. When the second sensing electrodes 501 and 502 are made of the same structure material, the size of the second sensing electrode 501 may be formed to be larger than the second sensing electrode 502.

As described above, when the touch capacitance $C_t$ between the second sensing electrodes 501 and 502 is different, the touch detection voltage $V_B$ is different, the detector 30 may determine whether the object touch the touch panel near the second sensing electrodes 501 and 502 based on the difference of the touch detection voltage $V_B$.

For example, if the resistance value of the structure material of the second sensing electrode 501 is larger than the structure material of the second sensing electrode 502, the detector 30 may determine whether an object touched is one of the second sensing electrodes 501 and 502 depending on whether the touch detection voltage $V_B$ droped or a difference of an resistor-capacitor (RC) delay.

Based on the same principle, the driving method may determine an object touched rated in one of the first sensing electrodes 511 and 512 connected to the wire Lb. The same principle and driving method are also applied to the wires Lc and Ld.

According to exemplary embodiments described above, it is possible to provide a touch display device and a driving method thereof capable of increasing the touch resolution while maintaining the number of wires of the touch panel.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A touch display device, comprising:
    sensing electrodes arranged on a single layer of a touch panel; and
    a touch detection circuit configured to determine whether an object touches the touch panel by a voltage detected by the sensing electrodes,
    wherein the sensing electrodes comprise:
        a plurality of first groups, each first group comprising two first sensing electrodes spaced apart by having a second sensing electrode interposed between the two first sensing electrodes, each first group being connected to the touch detection circuit through a first wire; and
        a plurality of second groups, each second group comprising one second sensing electrode, each second group being connected to the touch detection circuit through a second wire,
    wherein the touch detection circuit is further configured to:
        apply a touch driving voltage to each second group in a time division manner,
        detect a touch detection voltage from each first group in the time division manner, and
        determine whether the object touches any first sensing electrode of the two first sensing electrodes of a first group by comparing the touch detection voltage with a first voltage.

2. The touch display device of claim 1, wherein the touch detection circuit is further configure to:
    compare the touch detection voltage at with the first voltage at every detection timing to count a frequency of a case in which a difference between the touch detection voltage and the first voltage exceeds a specific threshold range, and
    determine which first sensing electrode between the two first sensing electrodes is touched by the object based on the counted frequency,
    wherein the first voltage is the touch detection voltage when the object does not touch any first sensing electrode of the two first sensing electrodes of the first group.

3. The touch display device of claim 1, wherein the touch detection circuit is further configured to:
    apply the touch driving voltage to the first group adjacent to the second group one time or a plurality of times in the time division manner, detect the touch detection voltage from the second group one time or a plurality of times in the time division manner, and determine whether the object touches the one second sensing electrode of the second group.

4. The touch display device of claim 1, wherein each second group comprises at least two second sensing electrodes and the at least two second sensing electrodes of the second group are spaced by having at least one first sensing electrode interposed between the two second sensing electrodes.

5. The touch display device of claim 4, wherein the touch detection circuit is configured to:

apply a touch driving voltage to the first group, detect a touch detection voltage from the first group, and determine which first sensing electrode between the two first sensing electrodes is touched by the object based on a magnitude of the touch detection voltage.

6. The touch display device of claim 5, wherein at least one of a resistance value and a capacitance value is different in one first sensing electrode of the two first sensing electrodes of the first group.

7. A driving method of a touch display device, the method comprising:

applying a touch driving voltage to each second group of a plurality of second groups adjacent to a first group, among a plurality of first groups, multiple times in a time division manner, wherein each second group comprises one second electrode, and each first group, among the plurality of first groups, comprises two first sensing electrodes spaced apart by having the second sensing electrode interposed between the two first sensing electrodes;

detecting a touch detection voltage from the first group multiple times in the time division manner; and determining, by comparing the touch detection voltage with a first voltage, which first sensing electrode of two first sensing electrodes of the first group is touched by an object.

8. The driving method of claim 7, the method further comprising:

counting a frequency of a case in which a difference between the touch detection voltage and the first voltage exceeds a specific threshold range, wherein the first voltage is the touch detection voltage when the object does not touch any first or second sensing electrode at every detection timing.

9. The driving method of claim 8, the method further comprising:

applying the touch driving voltage to multiple first groups adjacent to the second group multiple times in the time division manner;

detecting the touch detection voltage from the second group multiple times in the time division manner; and determining which second sensing electrode of two second sensing electrodes of the second group is touched by the object.

10. The driving method of claim 8, the method further comprising:

applying the touch driving voltage to one first group adjacent to the second group;

detecting the touch detection voltage from the second group one time or multiple times in the time division manner; and determining whether the object touches one second sensing electrode of two second sensing electrodes comprising the second group.

* * * * *